May 29, 1928.  E. E. GREVE  1,671,580
FLOW PLUG
Filed Jan. 23, 1926
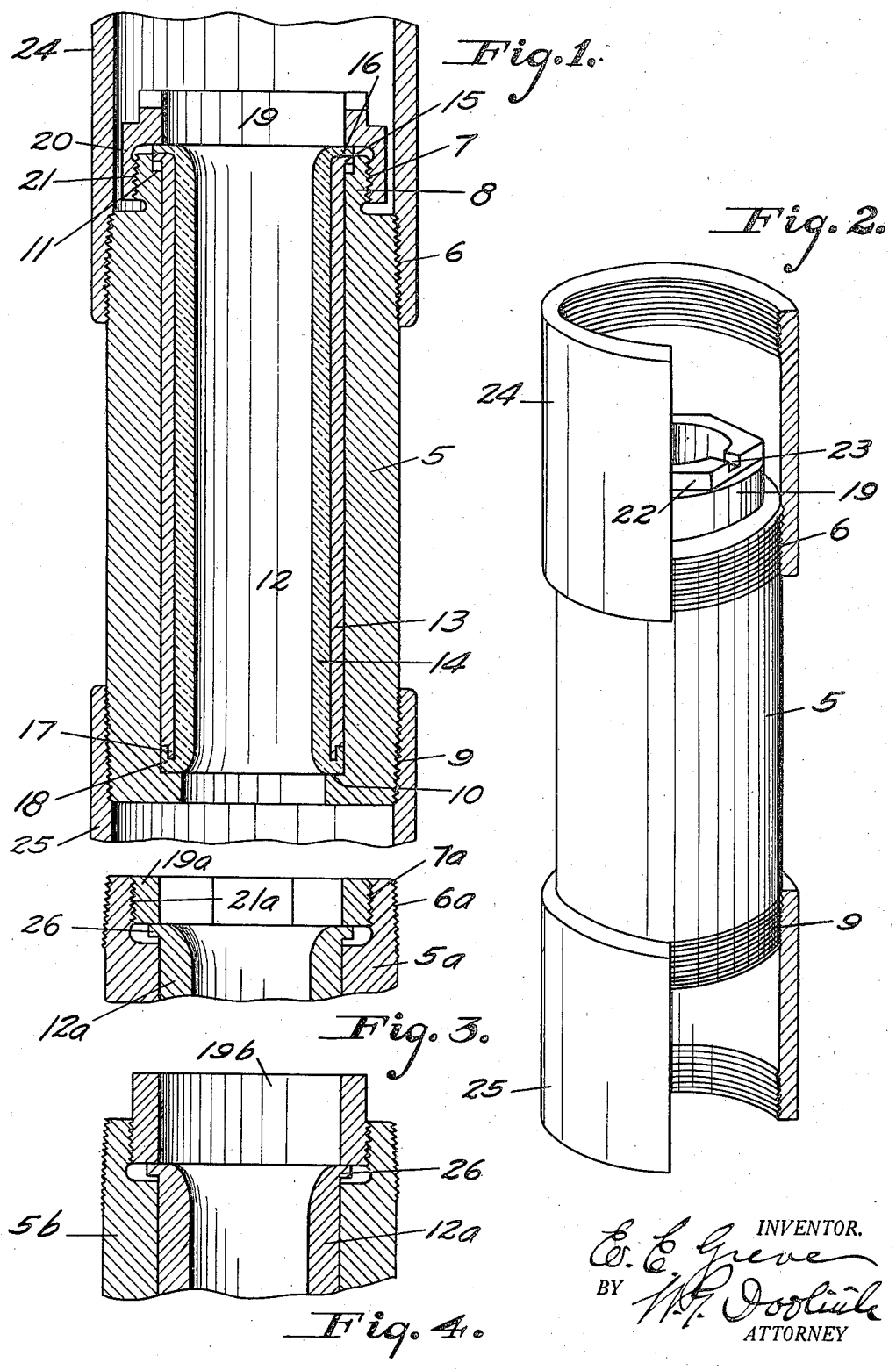
INVENTOR.
E. E. Greve
BY
ATTORNEY Patented May 29, 1928.

1,671,580

UNITED STATES PATENT OFFICE.

EDGAR E. GREVE, OF BELLEVUE, PENNSYLVANIA.

FLOW PLUG.

Application filed January 23, 1926. Serial No. 83,257.

My invention relates to a new and improved flow plug for use in the piping leading from an oil or gas well; and it is particularly designed to throttle down and control the rate of flow of the fluid through the said piping or conductor pipe.

Considerable trouble and expense has heretofore been met with in the use of flow plugs due primarily to the wearing away of the reducing flow member of the plug. This wearing away of the reducing member produces an enlargement of the bore of said member and necessitates the replacement of the worn member by a new one having its bore of a predetermined and desired diameter. The wearing away of the said flow member is due principally to sand and other gritty substances carried in suspension in the fluid, cutting the walls of the fluid passage.

An object of the present invention is to provide in a flow plug construction of the type specified a replaceable flow reducing member or bean of a simple and efficient character embodying a contact surface not readily effected by the gritty substances carried by the fluid, such for example, as a surface formed on a very hard metallic body or a surface provided on a resilient or yielding body such as rubber or a composition body of yielding materials.

Further objects of my invention are, to provide a construction in which the flow reducing member or bean may be readily inserted in and removed from the flow plug; a construction that may be easily coupled up with a string of casing or pipe; and a construction having a simple body member or housing.

In the accompanying drawing, which illustrates applications of my invention:

Figure 1, is a vertical sectional view of a flow plug embodying my invention and showing parts of pipe couplings connected therewith;

Figure 2, an elevational view of the flow plug and a part elevational and a part sectional view of the pipe couplings;

Figure 3, a detail sectional view showing a modified form of my invention; and

Figure 4, a still further modified form.

As illustrated, my reducing flow plug includes a hollow tubular body member 5, having in the form of Figure 1, an outer threaded portion 6 and an inner threaded portion 7, the latter being formed on a reduced end 8 of the body. At the opposite end of the body I provide an externally threaded portion 9 and an annular inner shoulder or ledge 10. A somewhat similar shoulder 11 may be provided at the end of the body having the said inner and the outer threaded portions.

Located within and having an end resting upon the annular shoulder 10 is a removable bushing or replaceable flow reducing member or bean 12.

This member 12 constitutes an important and characteristic feature of the present invention and as shown in the form of Figure 1, it comprises a hollow body formed of an outer metallic part or casing 13 and an inner member 14 formed of rubber or a composition of resilient or yielding materials. Casing member 13 is formed with an annular flange 15 at one end thereof, and the rubber or resilient member 14 has an overlapping end portion 16 arranged over the said flange. At the opposite ends of the respective members 13 and 14, I provide a flange 17 and another overlapping edge 18.

The replaceable reducing member 12 is held in position within the hollow body 5 between the flange 10 and a locking member 19.

In the form of Figure 1, locking member 19 is formed with a depending portion 20; the latter being internally threaded at 21; said threaded portion being adapted to engage the threaded reduced end of the body member 5. As shown by Figure 2, member 19 may be provided with flat wrench engaging faces 22, and with a slot 23, the slot being provided, to permit the use of a screw driver or other tool in adjusting the locking member 19. 24 and 25 designate coupling members secured to the respective ends of the flow plug body member whereby the plug is adapted to be coupled up with adjacent pipe sections, not shown, of a pipe line or a string of casing.

It will be understood that the entire flow of fluid will pass through the flow reducing member of the plug and that the bore of this member should be of such diameter as to permit the passage of a predetermined and desired amount of fluid. The reducing member may be readily removed from the body member by removing the locking member 19, member 12 being maintained in position within the body solely by means of member 19.

In the form of Figure 3, I provide the body member 5ª with a threaded portion 6ª and an inner threaded portion 7ª; in this form the locking member 19ª is designed to be entered in an end of the body member 5ª and have its threaded portion 21ª engage the threads 7ª of the body member.

The flow reducing member 12ª of the form of Figure 3 is preferably made of very hard high carbon steel, instead of some yielding material as in the form of Figure 1. Member 12ª in this form is flanged at 26 and is adapted to contact with the locking member 19ª when the latter is entered in an end of the body 5ª.

A still further modification is shown by Figure 4, in this last named form, the main difference over the form of Figure 3 resides in the member 19ᵇ. This member 19ᵇ is entered in a body member 5ᵇ which corresponds with member 5ª; member 19ᵇ projects beyond the end of the body member, but has its lower end in contact with the replaceable reducing member 12ª the same as in the other two forms.

What I claim is:

1. A flow plug comprising a hollow body member, a hollow metallic removable flow reducing member disposed within the hollow body member and forming an uninterrupted passage therethrough, said flow reducing member having a yielding fluid contact portion and having an end thereof flanged, and a locking member engaging the said flange and cooperating with the body member.

2. A flow plug for oil or gas well piping, comprising a hollow body member, a hollow metallic removable flow reducing member disposed within the hollow body member and provided with a wear resisting surface, said flow reducing member having its ends flanged, a shoulder formed on the body member for engaging a flanged end of the reducing member, and a locking member arranged to bear against a flanged end of the reducing member and co-acting with the body member for retaining the flow reducing member in the body member, said reducing member forming an uninterrupted passage through the hollow body member.

3. In a flow plug, the combination with a hollow body member, of a replaceable flow reducing member disposed in the hollow body member and comprising an outer casing and a yielding flow contact portion, and means for retaining the reducing member in the hollow body.

4. In a flow plug for oil or gas well piping, the combination with an integral hollow body member having at one end thereof an outer threaded portion and an inner threaded portion and at its opposote end an outer threaded portion and an annular shoulder, of a replaceable flow reducing member disposed within the hollow body and having an end arranged in contact with said shoulder and removable through an end of the body, and an adjustable locking member having a threaded portion cooperating with the inner threaded portion of one end of the body and adapted to bear against the said reducing member for maintaining it within the body.

5. In a flow plug for oil or gas well piping, the combination with an integral hollow body member having at one end thereof an outer threaded portion and an inner threaded portion, of a replaceable hollow flow reducing member disposed within the hollow body and forming an uninterrupted fluid passage therethrough, said reducing member provided with a wear resisting surface, and an adjustable locking member cooperating with the body for maintaining the reducing member within the body.

In testimony whereof I affix my signature.

EDGAR E. GREVE.